United States Patent
Chou et al.

(10) Patent No.: US 9,272,493 B2
(45) Date of Patent: Mar. 1, 2016

(54) STAMPING HEAD USED FOR PRESSING ANISOTROPIC CONDUCTIVE FILM ONTO CERAMIC SUBSTRATE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Chien-Liang Chou, New Taipei (TW); Fang Ye, Shenzhen (CN); Yu-Shu Lin, New Taipei (TW); Shin-Wen Chen, New Taipei (TW); Wen-Chang Chen, New Taipei (TW); Yu-Tsan Cheng, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 563 days.

(21) Appl. No.: 13/727,473

(22) Filed: Dec. 26, 2012

(65) Prior Publication Data

US 2014/0053986 A1 Feb. 27, 2014

(30) Foreign Application Priority Data

Aug. 27, 2012 (CN) .......................... 2012 1 0307054

(51) Int. Cl.
*B32B 37/00* (2006.01)
*B32B 37/10* (2006.01)

(52) U.S. Cl.
CPC ........... *B32B 37/10* (2013.01); *B32B 2307/202* (2013.01); *B32B 2315/02* (2013.01)

(58) Field of Classification Search
CPC .............................. B32B 37/10; B29C 65/18
USPC .................... 156/553, 580, 581, 583.1, 583.4
See application file for complete search history.

(56) References Cited

U.S. PATENT DOCUMENTS

| 7,056,417 B2 * | 6/2006 | Haws et al. ................. 156/580.2 |
| 7,422,045 B2 * | 9/2008 | Polster .......................... 156/516 |

* cited by examiner

*Primary Examiner* — James Sells
(74) *Attorney, Agent, or Firm* — Novak Druce Connolly Bove + Quigg LLP

(57) ABSTRACT

A stamping head includes a stamping portion and a connection portion connected to the stamping portion. The stamping portion includes a top surface and four side surfaces. The stamping head defines a jag extending from a junction between a specific one of the side surfaces and the top surface toward a centre of the top surface. The jag passes through the specific side surface. When the stamping head presses a ACF onto a ceramic substrate, a residual air between the ACF and the ceramic substrate flows outside through the jag.

8 Claims, 4 Drawing Sheets

STAMPING HEAD USED FOR PRESSING ANISOTROPIC CONDUCTIVE FILM ONTO CERAMIC SUBSTRATE

BACKGROUND

1. Technical Field

The present disclosure relates to stamping heads and, particularly, to a stamping head used for pressing an anisotropic conductive film onto a ceramic substrate.

2. Description of Related Art

A typical image sensor package includes a ceramic substrate, an anisotropic conductive film and an image sensor. The image sensor is supported on and electrically connected to the ceramic substrate through the anisotropic conductive film. In assembly, the anisotropic conductive film first needs to be joined with the ceramic substrate, in a high temperature and high humidity condition. However, high temperature will cause higher air pressure than the force of adhesion of the anisotropic conductive film, this causes electrical connection between the image sensor and the ceramic substrate to be unstable.

Therefore, it is desirable to provide a stamping head used for pressing an anisotropic conductive film onto a ceramic substrate which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
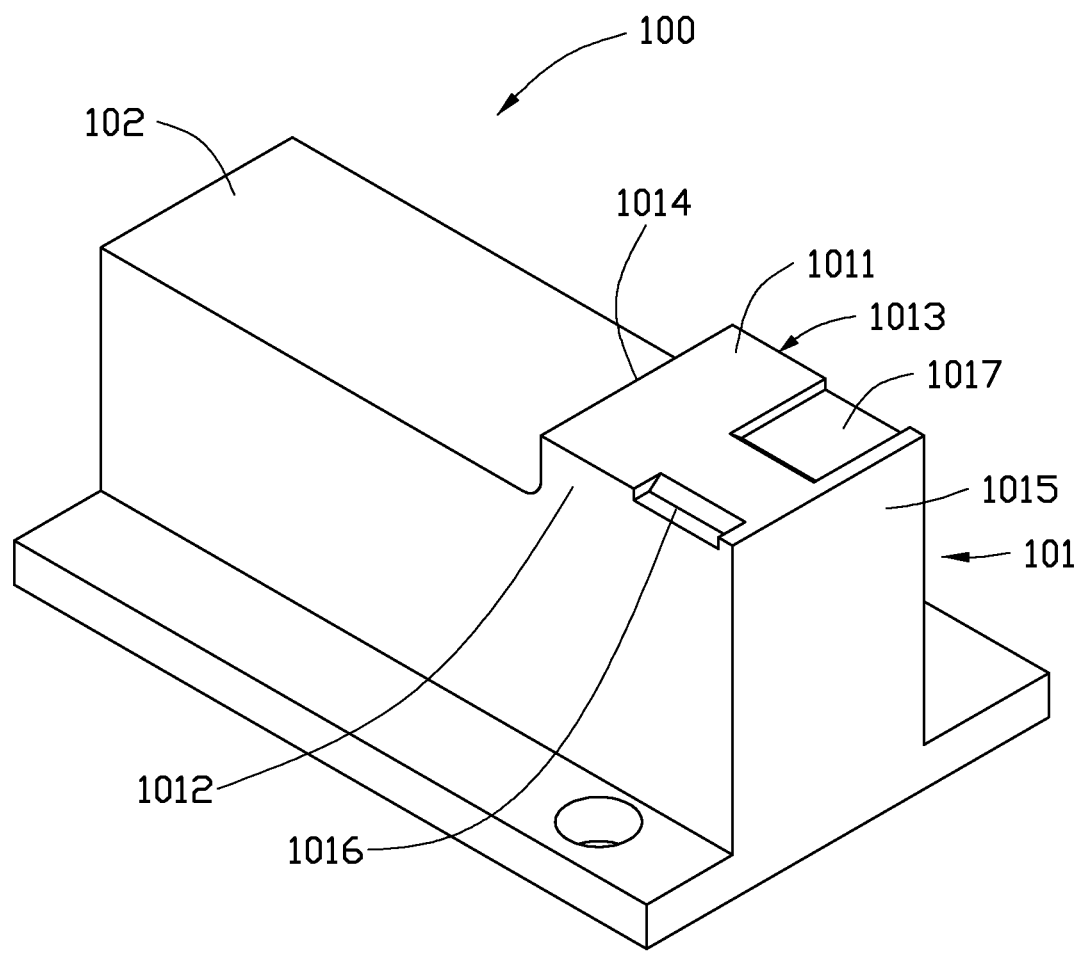
FIG. 1 is an assembled, isometric view of a stamping head, according to a first exemplary embodiment.
Figure 2:
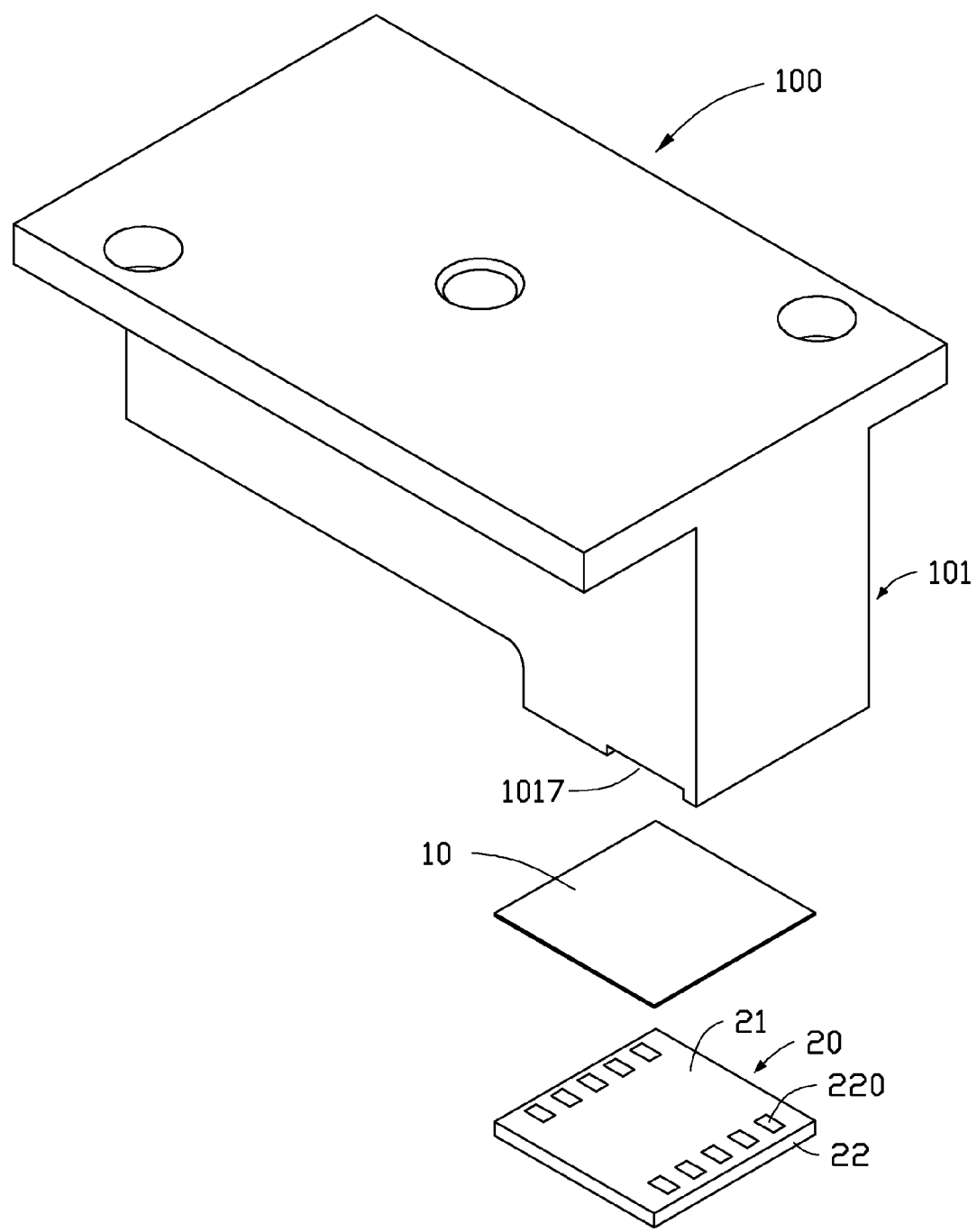
FIG. 2 is an isometric view of the stamping head of FIG. 1, but viewed from another angle, together with a ceramic substrate and an anisotropic conductive film.

FIG. 1-2 show a stamping head 100 according to a first exemplary embodiment. The stamping head 100 is used for pressing an anisotropic conductive film (ACF) 10 onto a ceramic substrate 20. The ceramic substrate 20 includes a package surface 21. The package surface 21 is substantially rectangular in shape and includes two opposite sidewalls 22 facing away from each other. A number of pads 220 are respectively mounted on the two opposite sidewalls 22. The ACF 10 is pressed on the package surface 21 through the stamping head 100. The pads 220 are entirely covered by the ACF 10.

The stamping head 100 includes a stamping portion 101 and a connection portion 102 connected to the stamping portion 101.

The shape of the stamping portion 101 corresponds to the shape of the package surface 21. In the embodiment, the stamping portion 101 includes a top surface 1011 and four side surfaces perpendicularly extending downward from the top surface 1011. The four side surfaces include a first side surface 1012, a second side surface 1013 parallel to the first side surface 1012, a third side surface 1014, and a fourth side surface 1015 parallel to the third side surface 1014. The first side surface 1012 perpendicularly connects the third side surface 1014 with the fourth side surface 1015. The second side surface 1013 also perpendicularly connects the third side surface 1014 with the fourth side surface 1015.

In the embodiment, the stamping portion 101 defines a first jag 1016 extending from a junction between the top surface 1011 and the first side surface 1012 toward a centre of the top surface 1011. The first jag 1016 passes through the first side surface 1012. The stamping portion 101 also defines a second jag 1017 extending from a junction between the top surface 1011 and the second side surface 1013 toward the centre of the top surface 1011. The second jag 1017 passes through the second side surface 1013.

In the embodiment, a width of the first jag 1016 in a direction parallel to the first side surface 1012 is substantially equal to a width of the second jag 1017. A length of the first jag 1016 in a direction perpendicular to the first side surface 1012 is smaller than a length of the second jag 1017. A depth of the first jag 1016 in a direction perpendicular to the top surface 1011 is substantially equal to a depth of the second jag 1017. The depths of the first jag 1016 and the second jag 1017 are smaller than a height of the stamping portion 101.

In use, first the ACF 10 is coated on the package surface 21; then, in a high temperature and high humidity condition, the stamping head 100 presses the ACF 10 with the first jag 1016 and the second jag 1017 being positioned on the other two side surfaces of the ceramic substrate 20. The other two side surfaces of the ceramic substrate 20 without any pads 220. A residual air between the ACF 10 and the package surface 21 can flow outside through the first jag 1016 and the second jag 1017.

Figure 3:
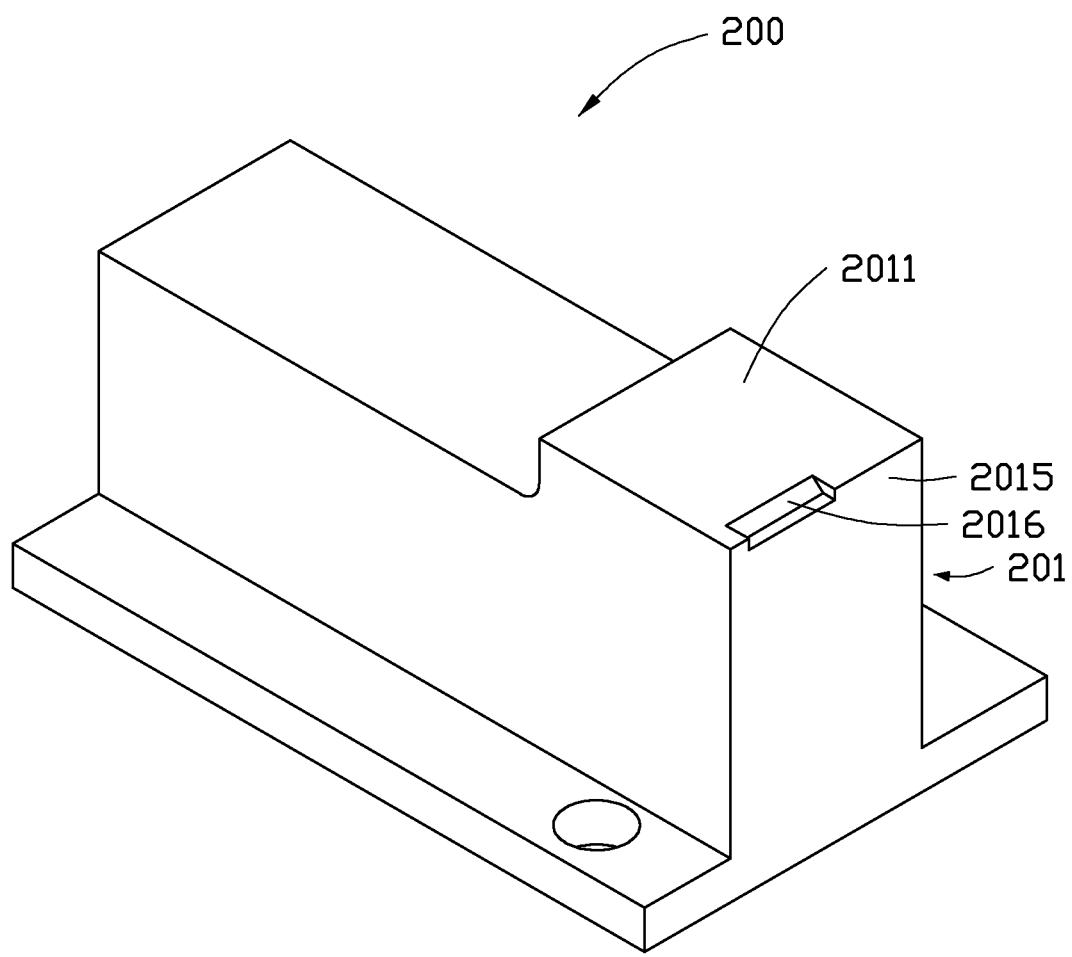
FIG. 3 is an assembled, isometric view of a stamping head, according to a second exemplary embodiment.
Figure 4:
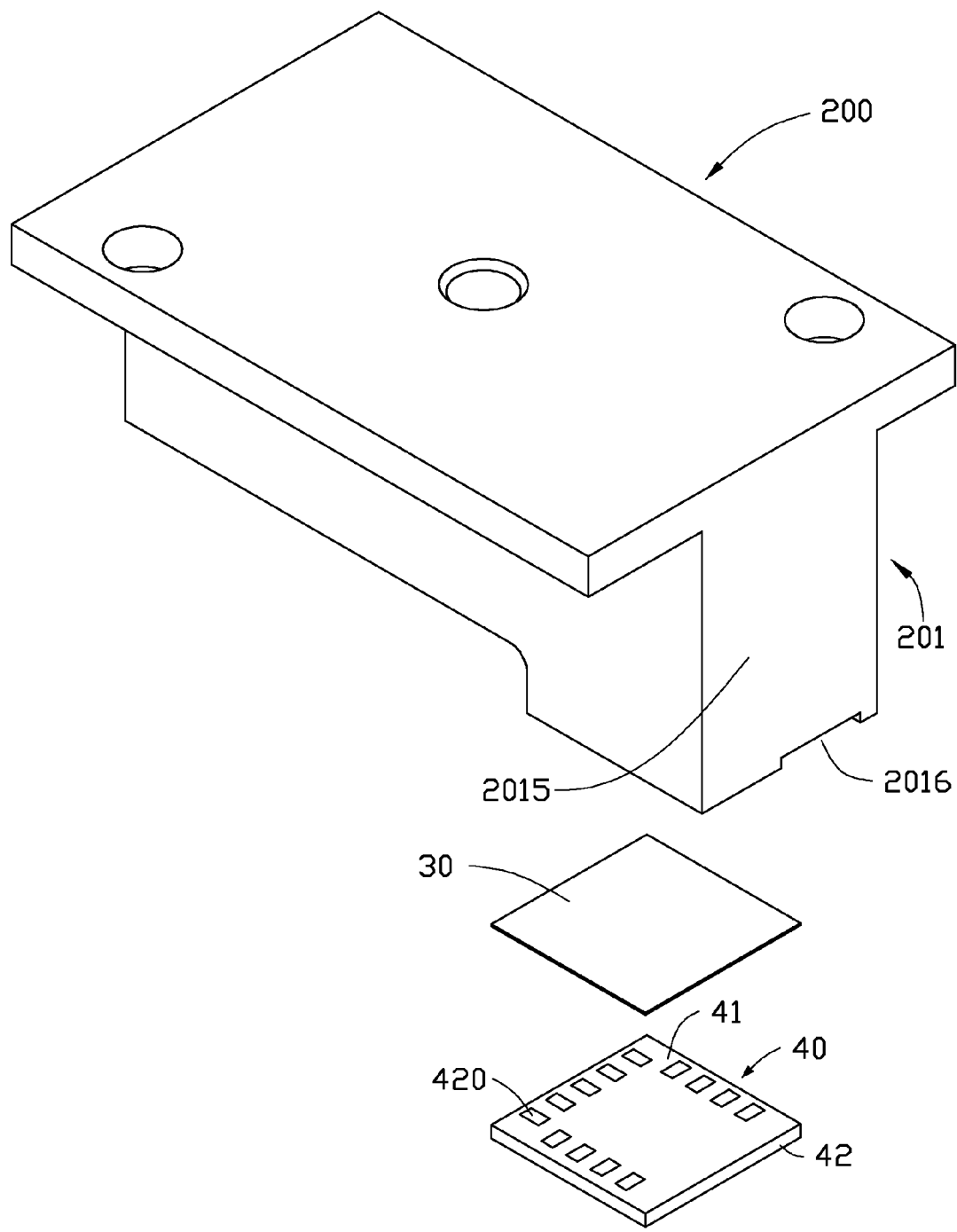
FIG. 4 is an isometric view of the stamping head of FIG. 3, but viewed from another angle, together with a ceramic substrate and an anisotropic conductive film.

FIG. 3-4 show that a stamping head 200 is used for pressing a ACF 30 onto a ceramic substrate 40, according to a second exemplary embodiment. The ceramic substrate 40 includes a package surface 41. The package surface 41 is substantially rectangular in shape and includes four sidewalls 42. A number of pads 420 are respectively mounted on three of the sidewalls 42. The ACF 30 is pressed on the package surface 41 through the stamping head 200. The pads 420 are entirely covered by the ACF 30.

The stamping head 200 is essentially similar to the stamping head 100 in the first embodiment, except that the stamp head 200 defines a jag 2016 extending from a junction between the top surface 2011 and the fourth side surface 2015 toward a centre of the top surface 2011. The jag 2016 passes through the fourth side surface 2015.

If only one side surface 42 has a pad 420 mounted thereon, the stamping head 200 can define three jags 2016 respectively on three side surfaces 2015.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A stamping head used for pressing an anisotropic conductive film (ACF) onto a ceramic substrate, the stamping head comprising:
    a stamping portion comprising a top surface and four side surfaces, the four side surfaces comprising a first side surface and a second side surface parallel to the first side surface, the stamping portion defining a first jag extending from a junction between the first side surface and the top surface toward a centre of the top surface, the first jag passing through the specific side surface, the stamping portion further defining a second jag extending from a junction between the top surface and the second side surface toward the centre of the top surface, the second jag passing through the second side surface, the first jag being spaced from the second jag, when the stamping head presses the ACF onto the ceramic substrate, a residual air between the ACF and the ceramic substrate flows outside through the first jag and the second jag; and a connection portion connected to the stamping portion.

2. The stamping head of claim 1, wherein the four side surfaces perpendicularly extend from the top surface.

3. The stamping head of claim 1, wherein the four side surfaces further comprises a third side surface and a fourth side surface parallel to the third side surface, the first side surface perpendicularly connects the third side surface with the fourth side surface, the second side surface also perpendicularly connects the third side surface with the fourth side surface.

4. The stamping head of claim 1, wherein a width of the first jag in a direction parallel to the first side surface is substantially equal to a width of the second jag.

5. The stamping head of claim 1, wherein a length of the first jag in a direction perpendicular to the first side surface is smaller than a length of the second jag.

6. The stamping head of claim 1, wherein a depth of the first jag in a direction perpendicular to the top surface is substantially equal to a depth of the second jag.

7. The stamping head of claim 6 wherein the depths of the first jag and the second jag are smaller than a height of the stamping portion.

8. The stamping head of claim 1, wherein a sum of a length of the first jag in a direction perpendicular to the first side surface and a length of the second jag is smaller than a distance between the first side surface and the second side surface, thereby causing the first jag to be spaced from the second jag.

* * * * *